Figure 1:
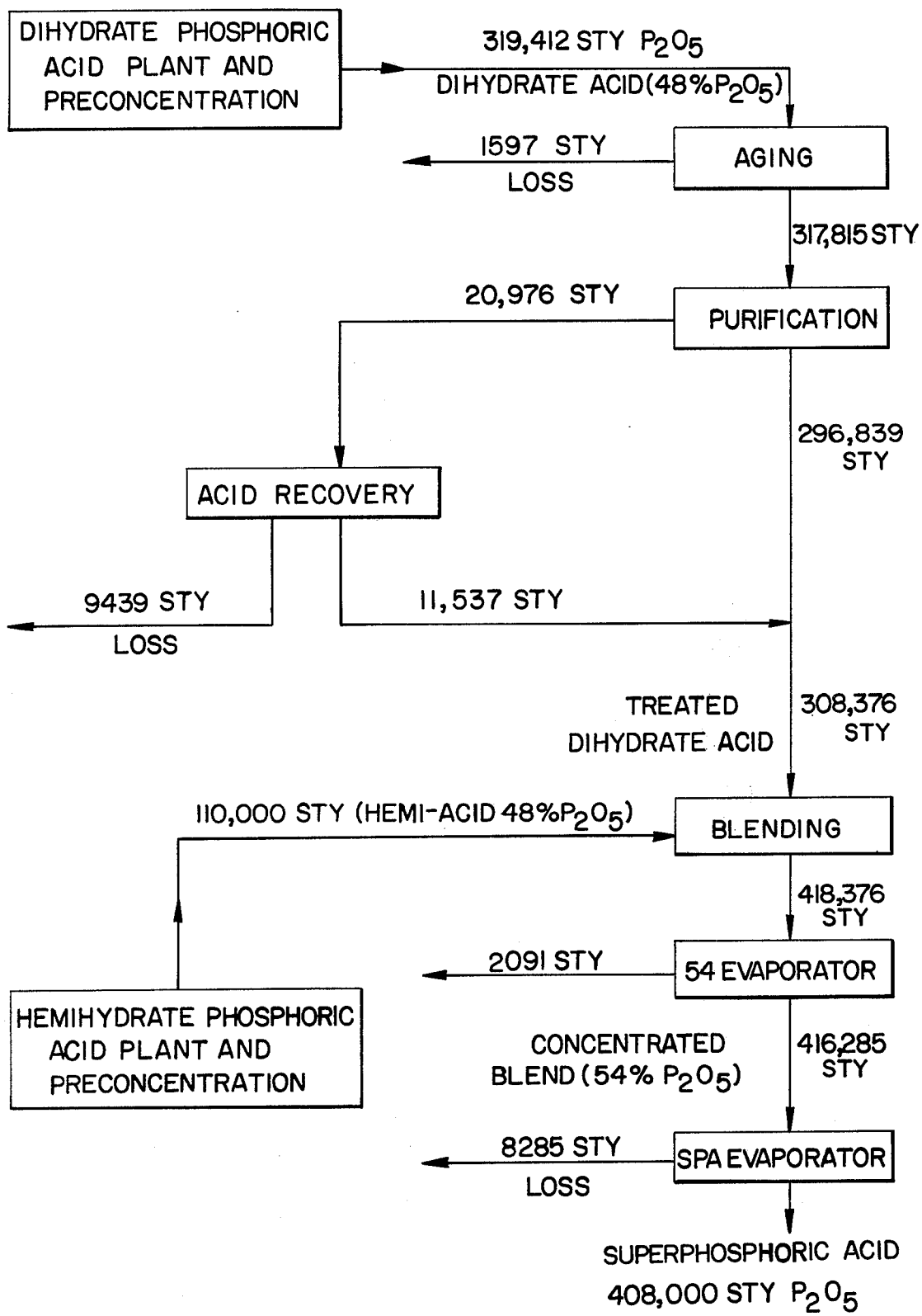

United States Patent [19]

Mills et al.

[11] 4,376,756

[45] Mar. 15, 1983

[54] PROCESS FOR BLENDING PHOSPHORIC ACIDS OF DIFFERING IMPURITY CONTENT

[75] Inventors: Harold E. Mills; David L. Murdock, both of Lake City; Richard M. Ramer, Gainesville; Francis M. Sale, Lake City, all of Fla.

[73] Assignee: Occidental Chemical Company, White Springs, Fla.

[21] Appl. No.: 215,885

[22] Filed: Dec. 5, 1980

[51] Int. Cl.³ ............................................. C01B 25/16
[52] U.S. Cl. .................................... 423/317; 423/319; 423/320; 423/321 R
[58] Field of Search ........... 423/317, 319, 320, 321 R, 423/321 S, 166, 158

[56] References Cited

U.S. PATENT DOCUMENTS

| | | | |
|---|---|---|---|
| 3,467,162 | 9/1969 | Putnam | 423/321 R |
| 3,607,031 | 9/1971 | Barilli et al. | 423/321 R |
| 3,694,153 | 9/1972 | Williams et al. | 423/321 |
| 4,053,564 | 10/1977 | Bradford et al. | 423/321 |
| 4,082,836 | 4/1978 | Ore | 423/321 |
| 4,136,199 | 1/1979 | Mills | 423/317 X |
| 4,171,342 | 10/1979 | Hirko et al. | 423/160 |
| 4,235,854 | 11/1980 | Smith et al. | 423/320 |
| 4,243,637 | 1/1981 | Bradford et al. | 423/10 |
| 4,243,643 | 1/1981 | Mills | 423/319 |
| 4,248,843 | 2/1981 | Williams et al. | 423/321 R |
| 4,260,584 | 4/1981 | Ore et al. | 422/189 |
| 4,264,563 | 4/1981 | Sikdar | 423/331 |
| 4,275,038 | 6/1981 | Sikdar et al. | 423/321 |
| 4,284,614 | 8/1981 | Ore | 423/321 |
| 4,313,919 | 2/1982 | Richards et al. | 423/321 |

OTHER PUBLICATIONS

Slack, Phosphoric Acid, vol. II, pp. 639, 642–645, 650, 651 (1968).

Primary Examiner—O. R. Vertiz
Assistant Examiner—Gregory A. Heller
Attorney, Agent, or Firm—Barry A. Bisson

[57] ABSTRACT

Phosphoric acids of significantly different content of soluble impurities, especially magnesium compounds, can be blended to produce a phosphoric acid with a decreased tendency for forming detrimental solids when converted to a liquid fertilizer or on storage, or during transportation as when the acid is transported by ocean vessel or railroad tank car. The blending can be effected either before or after a concentration step or steps (e.g., evaporation to "merchant grade" or to superphosphoric acid). For example, wet process phosphoric acid produced by a dihydrate or gypsum process can be blended with a phosphoric acid produced by a hemihydrate process.

21 Claims, 9 Drawing Figures

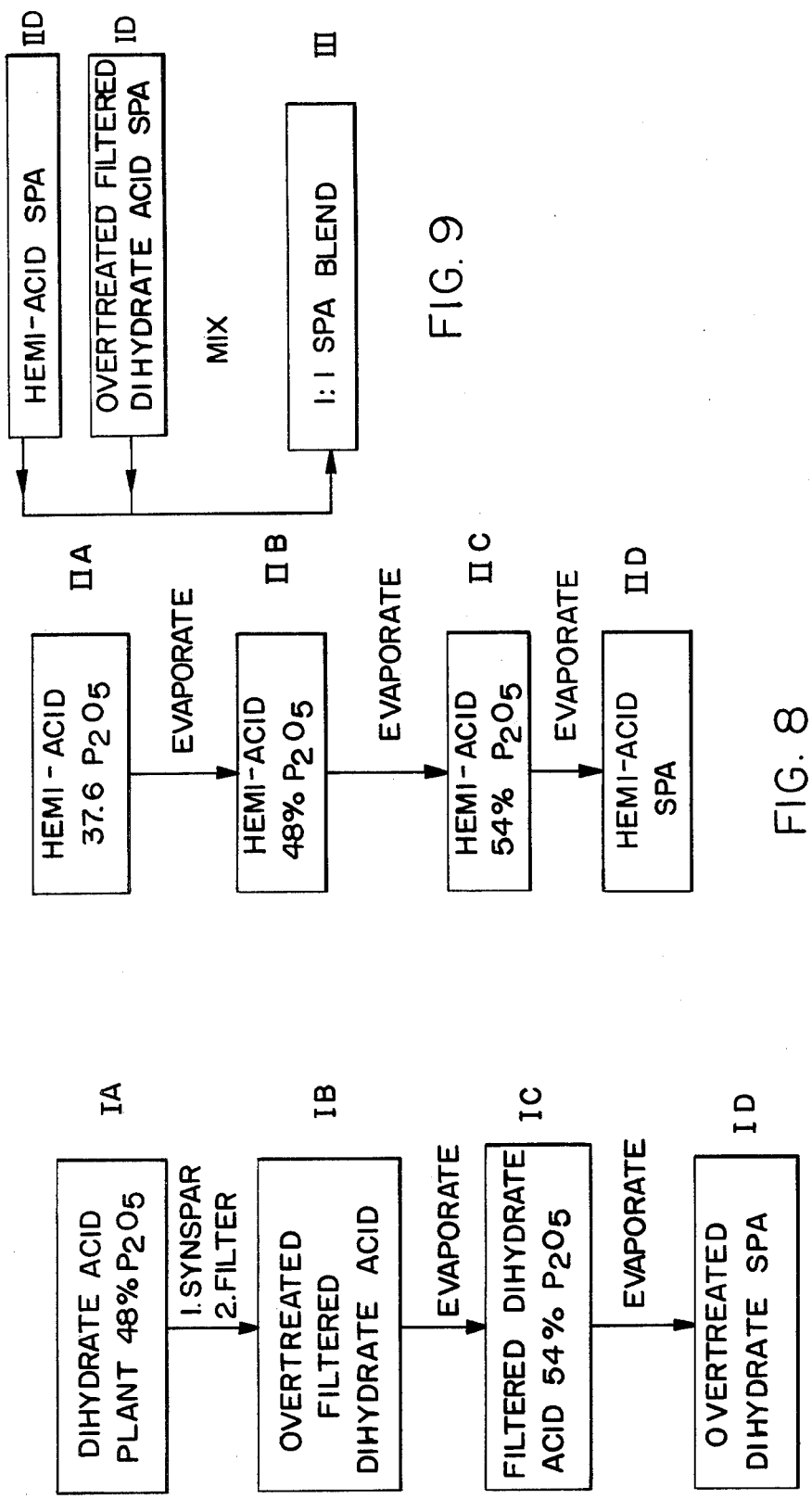

PROCESS FOR BLENDING PHOSPHORIC ACIDS OF DIFFERING IMPURITY CONTENT

CROSS REFERENCES TO RELATED APPLICATIONS

This application is related to commonly owned pending U.S. patent applications Ser. No. 169,078 filed July 15, 1980 by Richards, Harvey and Daigle, (now U.S. Pat. No. 4,313,919), filed Nov. 14, 1980 by Smith et al., Ser. No. 971,702 filed Dec. 21, 1978 by Mills et al. now abandoned, Ser. No. 840,791 filed by Bradford and Oré, Ser. No. 29,178 filed Apr. 12, 1979, by Sikdar (now U.S. Pat. No. 4,264,563), Ser. No. 16,650 filed Mar. 1, 1979 by Sikdar, Adams and Winterbottom (now U.S. Pat. No. 4,275,038) and Ser. No. 145,641, filed May 1, 1980 by Oré (now U.S. Pat. No. 4,284,614). These applications deal with processes and apparatuses which are useful in removing solids-forming impurities and finely-divided solids from phosphoric acid and describe phosphoric acids produced by dihydrate and hemihydrate processes which can be used in the present invention. Another relevant patent application is co-pending U.S. patent application Ser. No. 4,260,584 by Oré et al., which discloses a preferred hemihydrate process for producing wet process phosphoric acid, in a multi-vessel reaction apparatus, wherein calcium sulfate hemihydrate is a product or by-product. Phosphoric acids produced by this process can be used in the present invention. The entire disclosure but none of the prosecution history of each of the above U.S. patent applications is hereby incorporated herein.

BACKGROUND OF THE INVENTION

This application is directed to a more economical method of producing a phosphoric acid with reduced tendency to form detrimental solids (e.g., sludge) during shipment or storage or upon conversion, as by ammoniation, to a liquid fertilizer. The invention is especially useful in the production of superphosphoric acid (hereinafter, sometimes, "SPA") generally having a $P_2O_5$ analysis in the range of about 68 to 72 weight percent.

Solids-forming impurities are usually removed from phosphoric acids produced by dihydrate or hemihydrate phosphoric acid processes before final evaporation to produce superphosphoric acid, because the high viscosity of SPA hinders settling of solids and makes filtration or extraction of solid impurities difficult, although SPA can be heated to elevated temperatures to decrease its viscosity and make it amenable to filtration.

Purification of phosphoric acid usually results in the loss of some phosphate values, that is $P_2O_5$ values. The present invention reduces the degree of phosphoric acid purification required for SPA manufacture; and, as a consequence, diminishes the loss of $P_2O_5$ values in producing SPA as compared to conventional methods of producing SPA. The invention also decreases the consumption of filter aid such as diatomaceous earth, during purification by aging and filtration.

Phosphoric acid produced by hemihydrate phosphoric acid processes, especially a low sulfate hemihydrate process (i.e. that is a process producing phosphoric acid of about 38–44% $P_2O_5$ with a sulfate ion concentration of less than about three percent (3%)), is sometimes not as readily purified by aging and filtration as phosphoric acid produced by conventional dihydrate phosphoric acid processes due to formation of fine magnesium-containing solids which can pass-through the filter aid on a rotary vacuum filter.

Moreover, when a phosphoric acid produced by a hemihydrate phosphoric acid process (hereinafter sometimes called "hemi-acid" or "hemihydrate process acid") is treated by prior art methods for precipitating and removing solids-forming impurities, some of the precipitate solids are very finely divided and can pass through filters, such as the diatomaceous earth filter disclosed in U.S. Pat. No. 4,235,854.

The purification of phosphoric acid produced by a low sulfate hemihydrate phosphoric acid process can be enhanced by the addition of a precipitant containing calcium and fluoride and; usually an additional sulfate ion, such as by the addition of sulfuric acid. The addition of a precipitant to hemi-acid comprising calcium and fluoride, as disclosed in the U.S. Pat. No. 4,136,199, and U.S. Pat. No. 4,243,643, especially with the addition of sulfuric acid, can be used to form larger precipitated solid particles which are filterable. The preferred precipitant is the sludge produced by the neutralization process of U.S. Pat. No. 4,171,342.

Low sulfate hemihydrate phosphoric acid processes have the economic advantage of consuming less sulfuric acid than other hemihydrate phosphoric acid processes. Accordingly, the addition of sulfate ion to phosphoric acid produced by a low sulfate hemi-hydrate phosphoric acid process for purification diminishes one of the advantages that low sulfate hemihydrate phosphoric acid processes have compared to other hemihydrate phosphoric acid processes.

One embodiment of the present invention permits the use of phosphoric acid produced from a low-sulfate hemihydrate phosphoric acid process in the manufacture of SPA without using additional sulfate ion, or with reduced consumption of sulfate ion during purification by aging and filtration.

Other processes for removing impurities are disclosed in U.S. Pat. Nos. 3,694,153; 4,053,564; and 4,082,836, wherein metallic impurities are extracted using a solvent which is relatively selective for the impurities. Other extraction processes are disclosed in U.S. Pat. No. 4,284,614 or Ore, U.S. Pat. No. 4,243,637 of Bradford et al., and U.S. Pat. No. 4,275,038 of Sikdar, Adams and Winterbottom. Certain embodiments of the invention can reduce costs when phosphoric acid is purified by such extraction processes.

In a preferred embodiment of the present invention, dihydrate acid is purified and blended with unpurified hemihydrate acid, which is more difficult to purify than dihydrate acid, to produce a stable product that can be concentrated and further processed to yield liquid fertilizer products having good storage and transportation keep properties, but are difficult to purify if solid impurities precipitate out.

SUMMARY OF THE INVENTION

The present invention relates to combining, as by blending, phosphoric acids of significantly different content of soluble impurities, especially magnesium compounds, to produce phosphoric acid products, such as superphosphoric acid. The combining can be effected either before or after a concentration step or steps (e.g., evaporation to "merchant grade" or to SPA).

The invention is especially useful when phosphoric acids having significantly different levels of soluble impurities, produced by two or more different types of process, are combined. In one embodiment, phosphoric acid produced by a dihydrate or gypsum process (e.g., the "Prayon Process") is combined, preferably by blending, with phosphoric acid produced by a hemihydrate process (e.g., the process of U.S. Pat. No. 4,220,630).

An embodiment of the invention involves blending two such acids of differing impurities (e.g., MgO) content prior to concentrating the resulting blend to produce SPA. For example, a phosphoric acid produced by the gypsum or dihydrate phosphoric acid process (hereinafter sometimes "gypsum acid") containing, after initial evaporation, about 42–58%, preferably about 44–52% (e.g., 48%), by weight $P_2O_5$ and less than about 0.86 parts by weight of MgO, preferably less than 0.60 parts by weight of MgO per hundred parts by weight of $P_2O_5$ can be blended with a hemihydrate process phosphoric acid containing more than about 0.86 parts by weight of MgO per hundred parts by weight of $P_2O_5$ to produce a phosphoric acid containing about 48% by weight of $P_2O_5$ and no more than about 0.86 parts by weight of MgO per hundred parts by weight of $P_2O_5$. The resulting blend can be evaporated to produce SPA containing about 68 to about 72 percent by weight $P_2O_5$.

Especially preferred is to blend a hemihydrate-process acid, containing more than about 0.86 parts by weight of MgO per hundred parts by weight of $P_2O_5$, with a dihydrate acid containing less than about 0.86 parts by weight of MgO per hundred parts by weight of $P_2O_5$. The weight ratio of dissolved MgO to dissolved $P_2O_5$ (hereinafter sometimes, called "R" or the "R-value") is expressed by the following formula:

$$R = 100 \times \frac{\text{MgO Analysis by Weight}}{P_2O_5 \text{ Analysis by Weight}}$$

The MgO analysis and $P_2O_5$ analysis of phosphoric acid are carried out with the analytical methods set forth in the "Official Methods of Analysis of the Association of Official Analytical Chemists," 1980, Association of Florida Phosphate Chemists, Bartow, Fla., pages 11, 12, 20 and 21 a copy of which is attached hereto and incorporated herein.

The invention includes a process for producing a blended phosphoric acid having an R-value no greater than about 0.86.

To blend a phosphoric acid with an R-value of about 0.86, the weight ratio of high R-value phosphoric acid to low R-value phosphoric acid can be as low as about 1:10 to as high as about 4:1, but typically is in the range of about 1:4 to about 3:1.

As used herein, when an acid is said to contain "MgO" or some other oxide, it is meant that the acid contains the element (e.g., magnesium) in chemically combined form in solution which, as is conventional in the art, is expressed analytically as the oxide (e.g., MgO). Unless otherwise noted, all percentages and parts herein are by weight. The symbol "v/v" when used hereinafter means percent by volume.

In an alternative embodiment of this invention, 48% $P_2O_5$ phosphoric acids can be concentrated to the range of about 68 to about 72% $P_2O_5$ and then blended to produce a final SPA blend containing no more than about 0.86 parts by weight MgO per hundred parts by weight $P_2O_5$.

In such blending, at least one phosphoric acid produced by the dihydrate process has been aged for sufficient time to allow at least some magnesium-containing solids to precipitate from the acid and at least some of the precipitated solids have been separated from the acid prior to blending to produce a dihydrate process phosphoric acid having an R-value less than 0.86. Preferably the filtration of the precipitate solids follows blending of the aged dihydrate acid with another phosphoric acid.

In an especially preferred embodiment of the present invention, a precipitant comprising calcium and fluoride is added to the dihydrate process acid prior to aging to enhance the precipitation of magnesium containing solids.

Blends of high MgO content hemihydrate SPA and low MgO content dihydrate SPA and containing no more than about 0.86 part MgO per hundred parts $P_2O_5$ are especially preferred for shipping long distances by ocean vessel.

One advantage of the invention is that when compared to conventional methods of treating all of the acid by aging and filtration to reduce soluble impurities, substantial cost savings can be made from such blending because of reduced loss of $P_2O_5$ to the filter cake during purification (see U.S. Pat. No. 4,313,919 regarding such losses), reduced consumption of filter aid, reduced energy consumption associated with purification and reduced capital costs and maintenance costs due to the reduced volume of phosphoric acid required to be filtered.

Although the primary phosphoric acid impurity referred to herein is soluble magnesium compounds, analytically expressed as MgO, the phosphoric acid can contain other impurities such as dissolved aluminum compounds, dissolved iron compounds and suspended solids. However, it has been found that if dihydrate acid having an R-value no greater than about 0.86 is blended with a hemi-acid to produce a phosphoric acid blend with an R-value less than 0.86, the resulting blend will usually have satisfactory low levels of the other impurities. Although the impurities prior to blending are normally in a soluble form, the soluble impurities can form solids upon storage, transportation or conversion into a liquid fertilizer, especially after the phosphoric acids are converted to SPA.

Another advantage is that such blending allows a much closer control of product uniformity than can be effected by treating all of the acid to reduce impurities. This close control can reduce "overtreating" costs. For example, when a precipitant containing calcium and fluoride is added to phosphoric acid and the resulting treated acid is allowed to age for several days, the final acid quality is not known until after the aged, treated acid has been filtered. To avoid the possibility of an out-of-specification product, the phosphoric acid will usually be overtreat with calcium, fluoride and sometimes, sulfate ion and, thus, incur a greater cost for purification than is required.

The present invention is to be distinguished from the usual practice in a phosphoric acid plant of coincidental blending of substantially similar phosphoric acids in a given storage tank. Such blending is usually done before aging and filtration, or other purification step, and is typically done at generally low $P_2O_5$ levels (e.g., about 29–42% $P_2O_5$) prior to concentration of the resulting coincidental blend to merchant grade or to SPA. In contrast the present invention must involve conscious segregation of acids (as in different railway tank cars) and a controlled, based on the analysis of each segregated acid, blending of segregated acids to obtain a blended phosphoric acid having given R-value. In the present invention the phosphoric acids which are blended have preferably been concentrated to at least about 44% $P_2O_5$, more preferred at least about 46 to 48% prior to the blending step. Phosphoric acids with concentrations of $P_2O_5$ above about 48% can be difficult to filter due to high viscosity.

In FIGS. 1–4, the first aging step does not involve filtration, nor adding a precipitant, but is a conventional clarification by decantation in a settling tank equipped with a rake.

THE DRAWINGS

Figure 2:
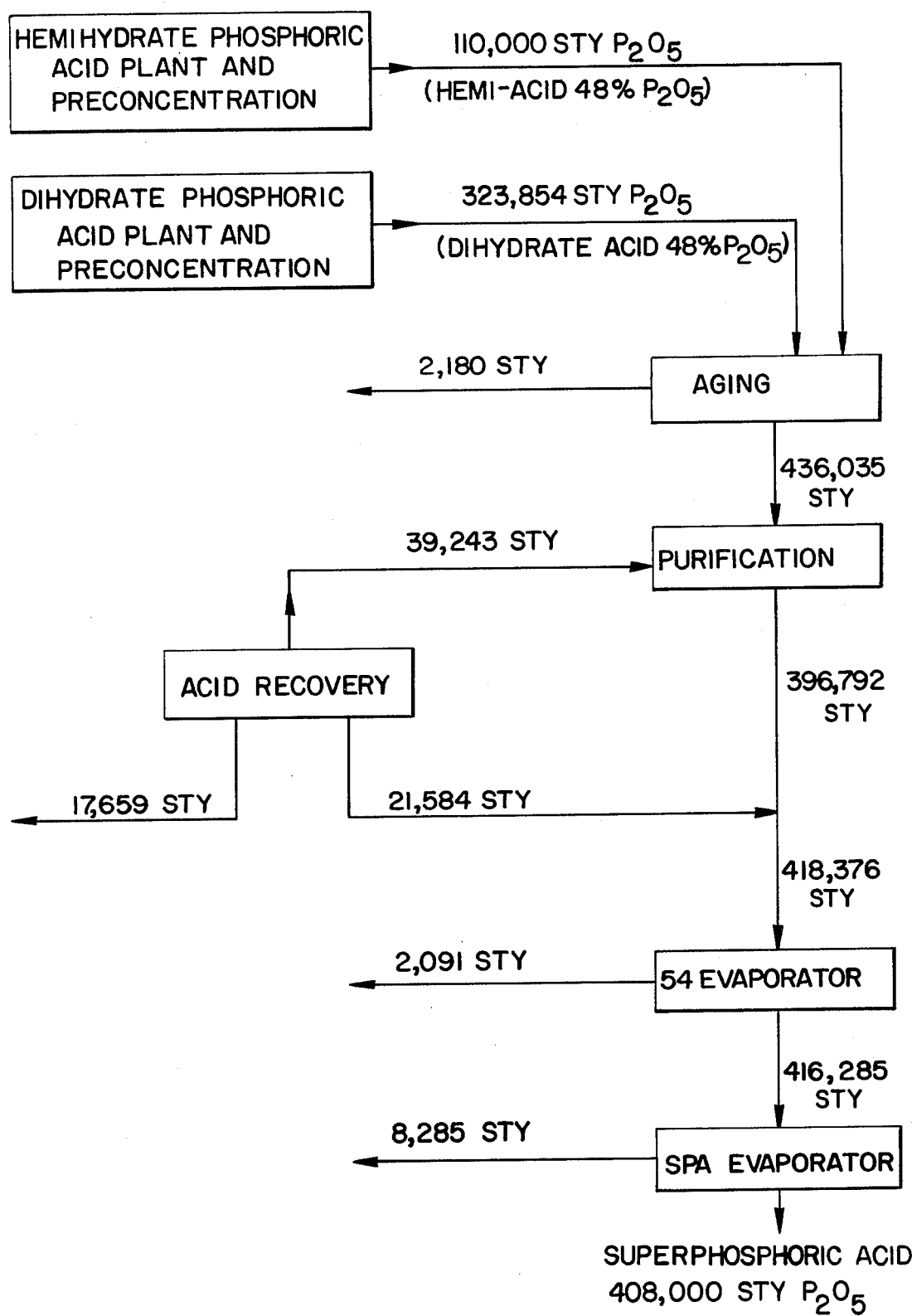

The accompanying FIGS. 1, 2, 3 and 4 compare four possible processes by which a phosphate manufacturer could produce 408,000 standard tons per year (STPY) of $P_2O_5$ in the form of 70±2% $P_2O_5$ superphosphoric acid. FIGS. 1 and 2 show calculated material balances for two processes which involve blending high R-value hemihydrate process acid (HEMI-ACID) with low R-value dihydrate process phosphoric acid (DI). In the Figures EVAPORATOR indicates an evaporation step.

In FIG. 1, a 48% $P_2O_5$ dihydrate acid is treated with a precipitant comprising calcium and fluoride followed by aging and vacuum filtration through a filter aid to produce an "over-treated" (low R-value) dihydrate acid which is then blended with sufficient untreated high R-value 48% $P_2O_5$ hemihydrate process phosphoric acid to produce a blend with an R-value no greater than 0.86. This blend is concentrated in two evaporation steps to produce SPA (i.e., "54 EVAPORATOR" and "SPA EVAPORATOR"), the first to about 54% $P_2O_5$, the second to a concentration of about 70% $P_2O_5$ analysis, the final SPA having an R-value no greater than 0.86.

In FIG. 2, a blend of "untreated" 48% $P_2O_5$ hemihydrate process acid and "untreated" 48% $P_2O_5$ dihydrate process acid is treated by aging and purification (as in FIG. 1) to produce a treated blend with an R-value of about 0.86, which is then evaporated in two steps, as in FIG. 1 to produce SPA of about 0.86 R-value and about 70% $P_2O_5$.

Figure 3:
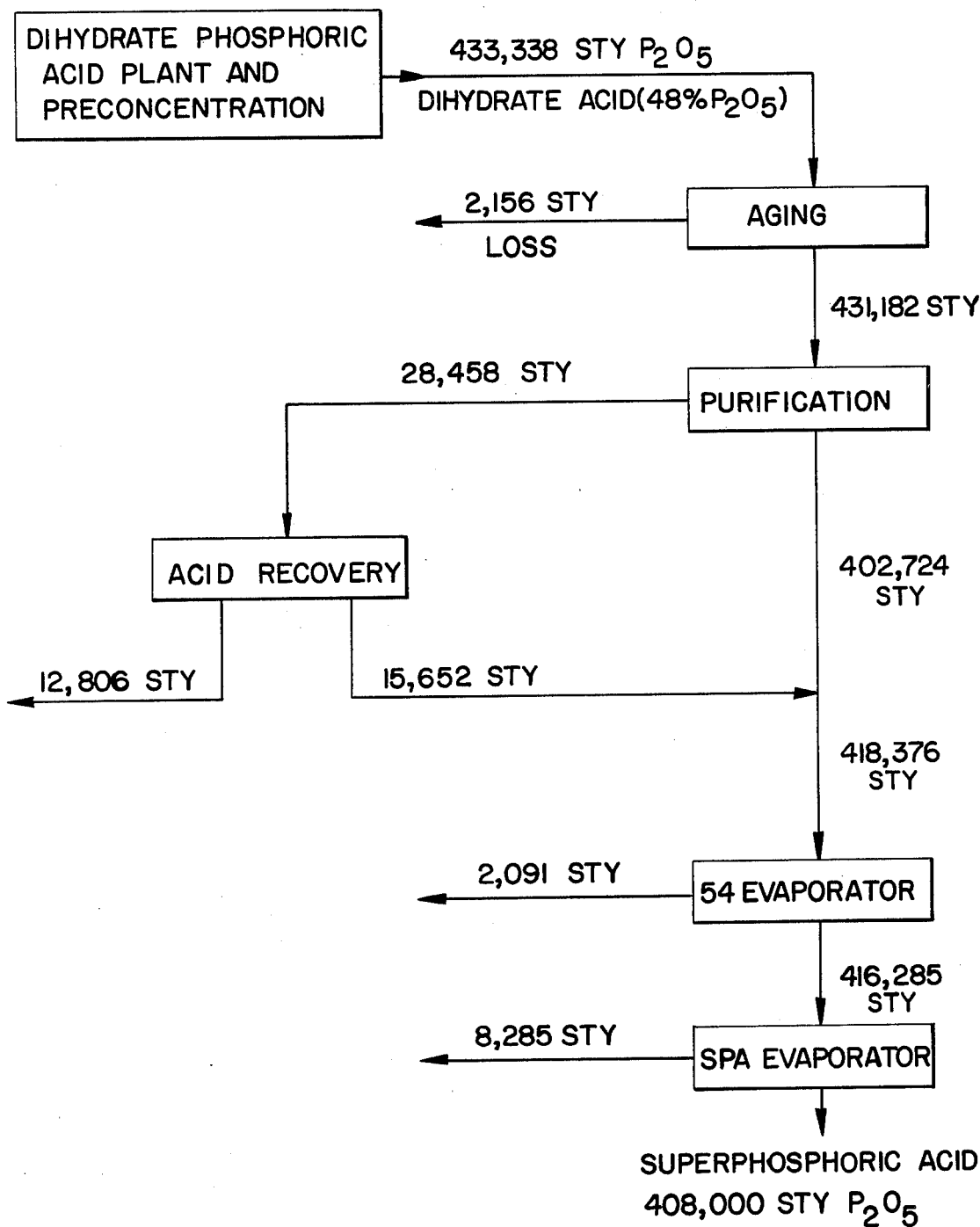

In FIG. 3, only dihydrate process phosphoric acid is purified and concentrated to SPA. "ACID RECOVERY" indicates filtration as set forth in the U.S. Patent Application of Smith et. al., Ser. No. 206,785 filed Nov. 14, 1980 wherein $P_2O_5$ losses from a vacuum filtration are reduced by making an aqueous slurry of spent diatomaceous earth from the filtration step and separating the solids (as by centrifugation) from the resulting aqueous liquid containing $P_2O_5$ values.

Figure 4:
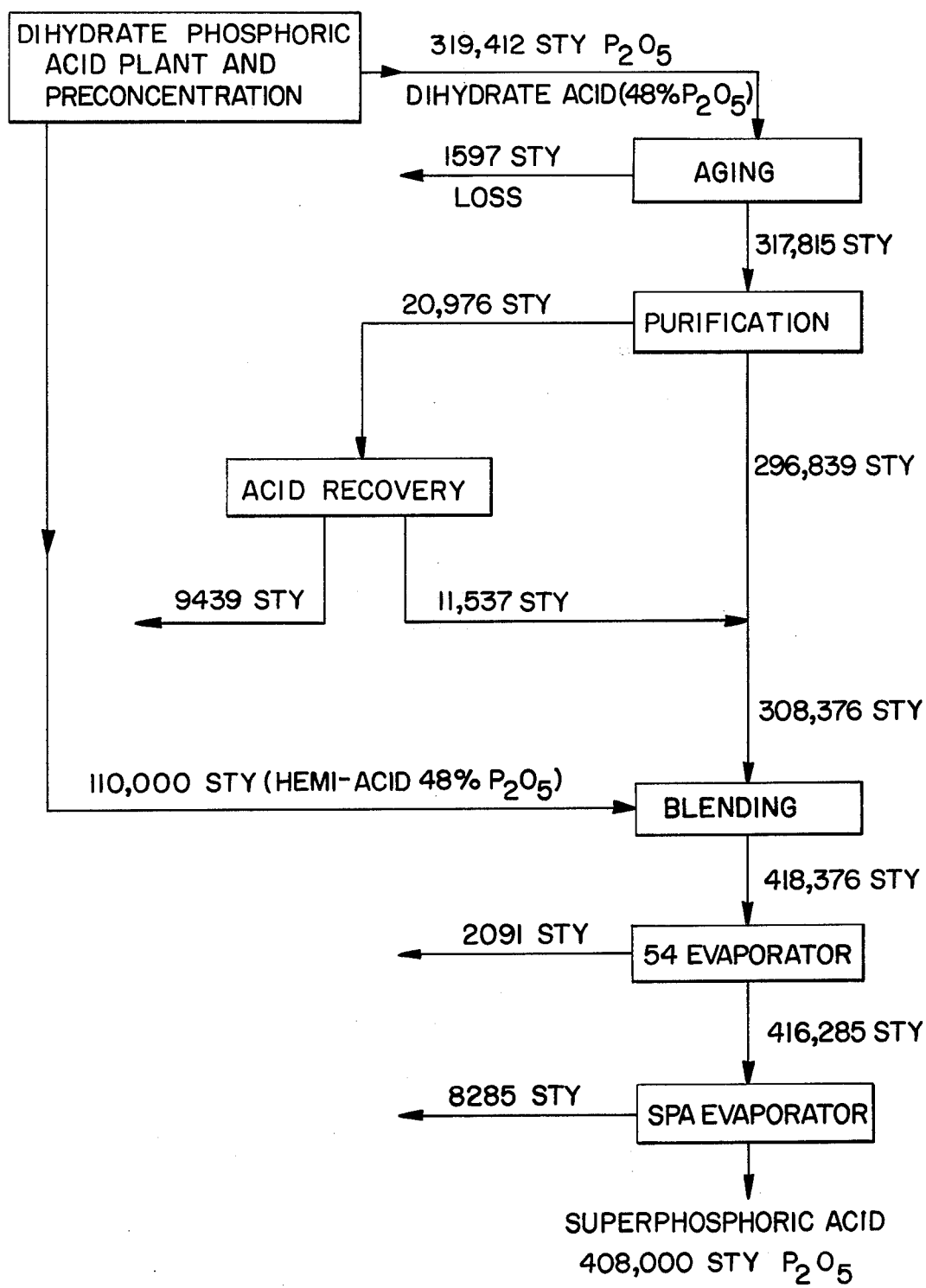

In FIG. 4, a phosphoric acid blend is prepared solely from dihydrate acids. Part of the dihydrate acid is "over-purified" to produce phosphoric acid of about 48% $P_2O_5$ having a R-value below 0.86. Unpurified, 48% $P_2O_5$ dihydrate acid is blended with the over-purified dihydrate acid to produce a blend having an R-value of about 0.86, which blend is then concentrated to SPA.

In FIGS. 1, 2, and 4, it is assumed that there is no penetration of very fine magnesium-containing solids (MgO-solids) through the filter cake on the vacuum filter; whereas, in FIG. 3, it is assumed that there is penetration of MgO solids of 0.1% of the weight of the hemi-acid processed.

Figure 6:
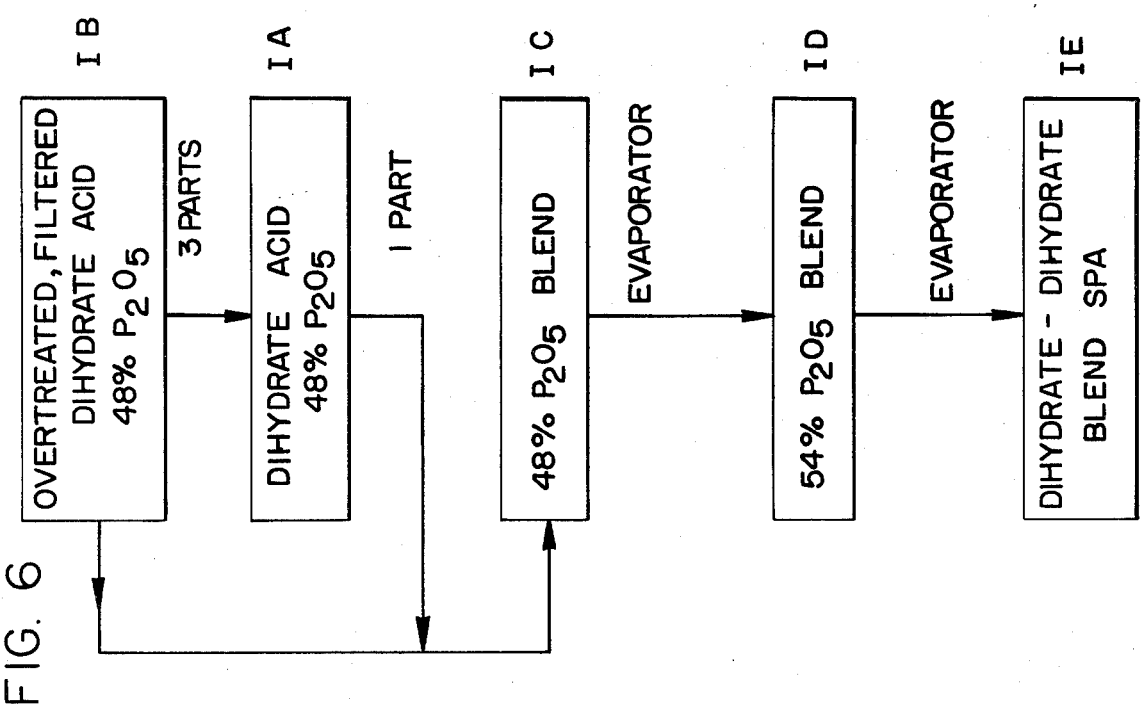
Figure 5:
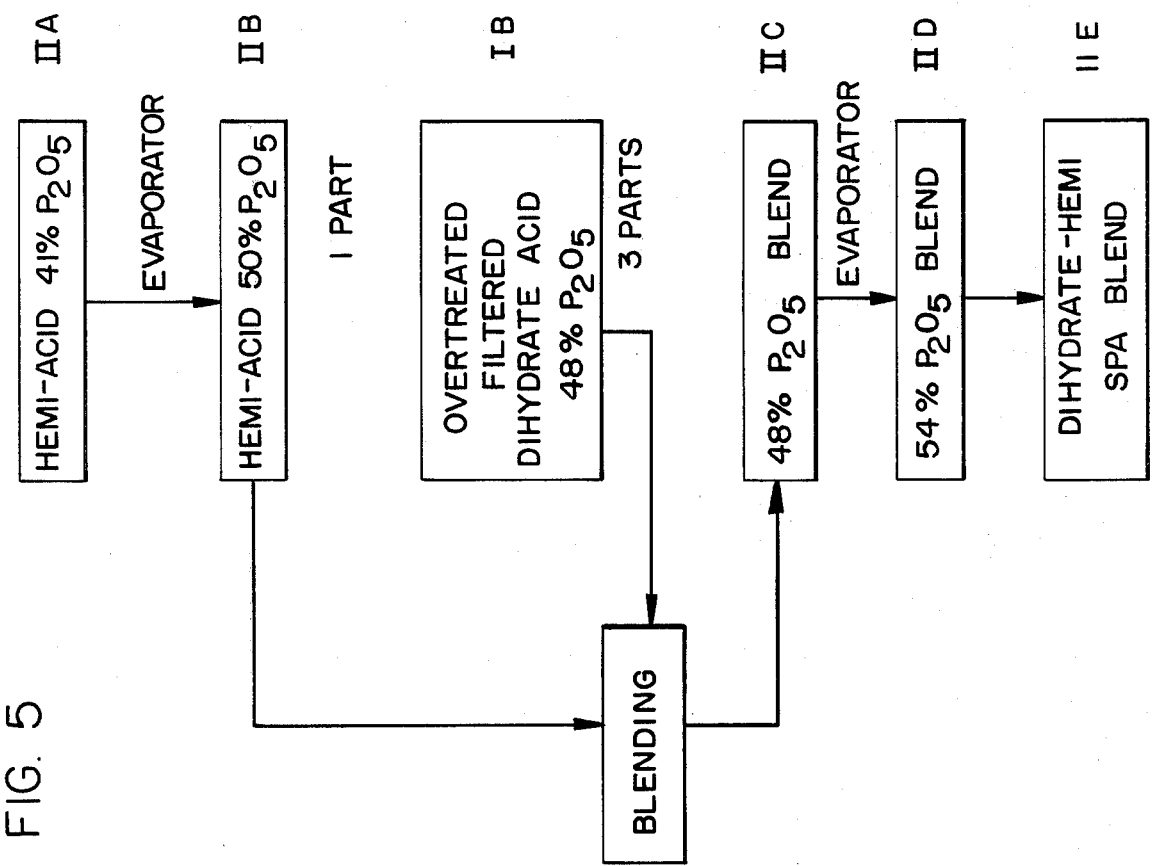

FIGS. 5 and 6 follow the analysis of undissolved solids and certain key elements (reported as oxides) at various process stages in experimental runs designed to evaluate two blending processes. These runs are further described in Example 2 and Tables 4 and 3 hereinafter. By "follow the analysis" is meant a report of the analysis of each product acid at each step of the process, as indicated by the legends.

In FIG. 6, an "over-treated" (low R-value, below 0.86) dihydrate acid of about 48% $P_2O_5$ is blended with an untreated (high-R-value, over 0.86) 48% dihydrate process phosphoric acid to produce a 48% $P_2O_5$ blend with R of about 0.86, which is then concentrated in two stages to produce SPA. Such blending can be useful in reducing $P_2O_5$ losses in a plant which does not have available hemi-acid or which has other uses for hemi-acid (such as for granulation to produce fertilizers).

In FIG. 5, a 41% $P_2O_5$ hemihydrate process acid is evaporated to about 50% $P_2O_5$ and blended with "over-treated" 48% $P_2O_5$ dihydrate process phosphoric acid to produce a blend which is concentrated in two stages to produce SPA.

FIGS. 7, 8, and 9 outline the results of further tests done on embodiments of the invention. These tests are further described in Example 3 and in Tables 5, 6 and 7.

FIGS. 1 through 4 show plant processes with a yearly capacity of 408,000 tons of $P_2O_5$. These figures are for illustrative purposes and are not intended as limitations to the processes of this invention.

FURTHER DESCRIPTION OF THE INVENTION

One preferred method of removing soluble impurities from either gypsum (i.e., dihydrate) acid or hemi-acid is taught in U.S. Patent Applications Ser. Nos. 954,647 (now U.S. Pat. No. 4,243,643) and 971,702 now abandoned, and involves determining, by analysis and calculation, the R-value, adding the corresponding amount of a precipitant containing calcium and fluorine (as from the formulae in U.S. Patent Application Ser. No. 971,202) and, if required, sulfuric acid, aging the resulting mixture for about four days to allow formation of a precipitate containing magnesium (and, usually other impurities) and separating the liquid phosphoric acid from the solid precipitate.

The preferred precipitant is the sludge obtained by treating a phosphoric acid plant pond water with calcium hydroxide and/or calcium carbonate (e.g., see U.S. Pat. Nos. 4,171,342 and 4,243,643). The sludge can be synthesized as disclosed in U.S. Pat. No. 4,264,563. The amount of such a sludge, on a dry basis, that is added to the acid is typically in the range of about 1 to about 5 weight percent, for a 48% $P_2O_5$ acid. Quantities as high as about 10 weight percent of the sludge, on a dry basis, can at times be useful because the solids in the sludge can, to some extent, act as a body feed filter aid. By a body feed filter aid is meant a filter aid which is admixed with a fluid to be filtered in contrast to a filter aid which is applied directly to the filter surface and not mixed with the fluid to be filtered prior to filtration.

Although the invention is generally described as blending a phosphoric acid of relatively high impurity level with a phosphoric acid of generally low impurity level, it is understood that, in practice, more than one given acid of each class can usually be blended to obtain a final product. For example, in a commercial operation where the acid is to be transported to the customer by a large ocean vessel, railway tank cars can be filled with hemihydrate process acid, for example, and other tank cars can be filled with gypsum acid and the cars transported to a storage area in the vicinity of the docks at the port where the vessel is to be loaded. At the port, tank cars can be filled with gypsum acid and the cars transported to a storage area in the vicinity of the docks at the port where the vessel is to be loaded. At the port, tank cars of phosphoric acid with relatively high and relatively low impurity content can be proportioned through a common mixing device to obtain a blended acid of the desired quality which can then be stored or transported directly to the vessel. It has been found, however, that it is more preferred from a materials handling and quality control point of view to substantially segregate the two types of acid into separate tankage and proportion them through a blending device directly into the ship (to produce a final phosphoric acid product with an R-value of about 0.86). In such a commercial procedure, it can be seen that each tank car of phosphoric acid can be considered as a separate phosphoric acid component of the final blended product. In such a commercial operation, for example, about three hundred tank cars could be required to fill the ship. About 150 to about 225, (e.g., about 200), of the tank cars would contain gypsum process SPA having an R-value less than about 0.86. About 150 to about 75 (e.g., about 100), of the tank cars would contain hemihydrate SPA having an R-value greater than about 0.86.

In the preferred embodiment of the present invention, dihydrate acid is treated with a precipitant containing calcium and fluoride, aged to a degree wherein the R-value for the aged acid is less than 0.86. Hemi-acid having an R-value greater than 0.86 and the treated dihydrate acid are blended to yield a phosphoric acid blend having an R-value no greater than 0.86. The phosphoric acid blend is then filtered and evaporated to make a merchant grade phosphoric acid or superphosphoric acid.

EXAMPLE 1

Table I presents analyses of four typical tank cars of dihydrate acid and of three typical tank cars of hemihydrate acid which were part of a total of about 296 tank cars which were blended to produce a final blended shipload of superphosphoric acid. The analysis of this final shipload is also shown in Table I. The phosphoric acids were blended directly, through a pipeline, from three storage tanks into the ship at a rate of about six hundred gallons per minute from each tank. After an ocean voyage of about fifteen days, the delivered shipload of acid was found to be acceptable quality. The owner of the ship later reported that the blended product was an especially good phosphoric acid for transport by his vessel. No complaints were received from the customer with respect to the quality of the acid or the quality of the fertilizer produced by the customer from the acid.

EXAMPLE 2

Two possible blending processes are compared in this Example; namely, Process (A) overtreated (i.e., with a precipitant comprising calcium and fluoride) and filtered 48% $P_2O_5$ dihydrate acid blended with untreated, unfiltered 48% $P_2O_5$ hemihydrate acid in a nominal 3:1 ratio and Process (B) the overtreated dihydrate acid of Process (A) blended with untreated, unfiltered 48% $P_2O_5$ dihydrate acid in a 3:1 weight ratio. These phosphoric acid blends were concentrated stepwise first to 54% $P_2O_5$ phosphoric acid and second to SPA of about 70% $P_2O_5$.

By "untreated" is meant that the acid is substantially as produced by the evaporation process and has not been aged and filtered.

By "overtreated" is meant that more precipitant and sulfuric acid were added to the acid, before aging and filtration than was calculated from the formulae in U.S. Patent Application Ser. No. 971,702.

Aging tests were undertaken for the two SPA blends of Process (A) and (B) as well as for overtreated dihydrate SPA and for untreated hemihydrate SPA alone. In addition, corrosion tests at several temperatures were run at various concentrations of the unblended acid components. Finally, the two SPA blends were converted to 10-34-0 liquid fertilizers which were then subjected to storage tests.

The data accumulated in this test blending program are summarized below:

Three to one, by weight, blends of 48% $P_2O_5$ overtreated, filtered dihydrate acid with either untreated, unfiltered 48% $P_2O_5$ dihydrate or hemihydrate acid were smoothly evaporated to SPA in a single tube forced circulation evaporator (STFCE). Aging tests on these SPA blends, run for 140 days, showed that solids had leveled at 2.0–3.0% after 88 days at 150° F. and 109 days at 180° F. at a rate of 0.45%/month. Conversion to polyphosphate remained nearly constant throughout the tests.*

*Viscosities of the SPA blends were less than 800 cp and some below 400 cp even after 140 days storage at 180° F. All viscosities herein are in centipoises (cp) determined by a Brookfield viscosimeter Model No. RVT, spindle No. 2, averaged from 5 measurements between 2.5 and 50 rpm, at 150° F.

The solids content of the two SPA blends converted to 10-34-0 liquid fertilizer, which were stored, was low: 0.38% by volume for the all-dihydrate acid blend after 109 days and 0.11% by volume for the dihydrate-hemihydrate blend after 124 days.

The data also show that SPA can be made from the all-dihydrate acid blend starting from a blending of 9 parts treated, filtered 48% dihydrate acid with one part untreated, unfiltered 48% dihydrate acid and that blending could be useful increasing to at least about a 7:3 ratio.

In any given blending case, the over-riding consideration is to provide monitoring of the controls on the blend ratio and treatment level to ensure that the final product meets specifications.

EXAMPLE 3

I. SPA Made From a Blend of One Part Untreated, Unfiltered 48% $P_2O_5$ Dihydrate Acid with Three Parts Overtreated and Filtered 48% $P_2O_5$ Dihydrate Acid One of the embodiments involved mixing three parts of overtreated and filtered 48% $P_2O_5$ dihydrate acid (IB) with one part untreated 48% $P_2O_5$ dihydrate acid (IA) (see FIG. 6). This blend ratio was based on a scheduled plant production of 319,000 tons per year (herein "tpy") dihydrate and 110,000 tpy hemihydrate acid. The resulting 48% mix had an analysis as shown in Table 3 (IC). The blend was evaporated to produce a 54% $P_2O_5$ acid (ID). However, further concentration to SPA produced a product with only 19.3% conversion (IE). This low conversion was probably caused by employing too low a conversion temperature. A portion of this blend was converted to 10-34-0 liquid fertilizer with high conversion (i.e., polyphosphate) from the fertilizer production process. After 109 days in storage, the liquid fertilizer solids were 0.38% by volume. Aging studies on the blend at 150° and 180° F. were stopped after 140 days. While conversion remained nearly constant, solids increased steadily after 49 days and leveled after 88 days at 150° F. and 109 days at 180° F. at 2.0–3.0%. Overall solids formation was 0.45%/month. Initial viscosity for this blend was about 295 cp at 150° F. and less than 500 cp after 140 days storage at 180° F. From this test data it was concluded that SPA production from this blend would present no unusual problems.

EXAMPLE 4

II. SPA Made from a Blend of One Part Untreated 50% $P_2O_5$ Hemihydrate Acid and Three Parts Overtreated and Filtered 48% $P_2O_5$ Dihydrate Acid SPA made from 3:1 dihydrate-hemihydrate blend was successfully produced after an initial foaming problem in the evaporator. One part of untreated, unfiltered 50% $P_2O_5$ hemihydrate acid (IIB), (see FIG. 5), produced from 41% $P_2O_5$ hemihydrate acid (IIA), was mixed with three parts of overtreated and filtered 48% dihydrate acid (IB) to produce a 48% $P_2O_5$ phosphoric acid blend (IIC). After batch concentration to 54% (IID), the resulting blend was evaporated to SPA (IIE). A portion of this SPA blend was converted to 10-34-0 high conversion liquid fertilizer. After 124 days in storage, solids in the 10-34-0 fertilizer were only 0.11% by volume. Temperature fluctuation during ammoniation of high solids SPA indicated that scale formation was greater than normal.

A. Aging studies on the blend at 150° F. and 180° F. were stopped after twenty weeks with little, if any, change in conversion. An increase in the solids rate of 0.45%/month was observed with leveling occurring at 2–3% total solids after 88 days at 150° F. and 109 days at 180° F. Initial viscosity measurements were less than 360 cp at 150° F. and less than 500 cp after 20 weeks storage at 180° F.

EXAMPLE 5

Two embodiments of the invention which were studied in the tests of Example 2 were: (A) 48% overtreated and filtered dihydrate mixed with 48% untreated, unfiltered hemihydrate in a nominal 3:1 ratio, and (B). The same overtreated dihydrate mixed with untreated, unfiltered 48% dihydrate in a nominal 3:1 ratio. These acid blends were then concentrated stepwise to 54% and then to SPA.

The present example compares a third embodiment, i.e., blending at the SPA level approximately equal parts of overtreated and filtered dihydrate and either untreated or partially purified hemihydrate. For these blends, as well as overtreated dihydrate SPA and untreated and partially purified hemihydrate SPA's alone, aging tests and selected settling studies were undertaken. In addition, corrosion tests at several temperatures were run at various concentrations on two of the unblended acid components. Finally, the various SPA blends were converted to 10-34-0 liquid fertilizer which was subjected to storage tests.

These tests showed that such blending to produce SPA would provide significant cost savings.

The following summarizes results of data accumulated in the blending tests:

Approximately equal parts of SPA made from overtreated, filtered 48% $P_2O_5$ dihydrate acid and SPA made from untreated or partially purified 48% $P_2O_5$ hemihydrate acid were blended uniformly. Aging characteristics of the blend involving 48% untreated, unfiltered hemihydrate show that at termination after 140 days at 150° F. and 180° F., non-ortho $P_2O_5$ content was virtually unchanged while solids content had increased at a rate of 0.36%/month, leveling after 88 days at 3.0–3.5% solids.

The results indicated that for blending at a nominal 1:1 ratio of 48% overtreated, filtered dihydrate SPA and hemihydrate SPA, solids concentration is approximately the arithmetic average of the blend components. While the blends made with partially treated hemihydrate SPA (i.e., filtered or settled at 48% or settled at 40%), gave lower volume % solids on aging (2.7%, 2.75%, and 3.1% respectively), the additional costs of these treatments would probably not usually be justified when compared to the blend involving untreated, unfiltered, hemihydrate (3.5% solids).

Surprisingly, when comparing 10-34-0 liquid fertilizers produced, the blend derived from untreated, unfiltered hemihydrate gave 10-34-0 with only 0.28% (v/v, i.e., volume %) solids after 400 days; whereas 10-34-0 from blends with 48% settled or 48% filtered hemihydrate had 0.29% and 0.28% solids (v/v) after 280 and 272 days storage respectively. The 10-34-0's made from the blend with 40% settled hemihydrate failed (solids greater than 3% v/v) after 346 days and also failed after 321 days for the blend made from 40% settled, 48% filtered hemihydrate. Thus, the blend containing untreated, unfiltered hemihydrate SPA appears to be superior from the standpoint of minimal rate of solids formation in the 10-34-0 produced from the blends. Viscosities of all blends were less than 600 cp after 180° F. storage for 140 days, which is considered satisfactory. Corrosion tests with dihydrate and hemihydrate acids at concentrations up to SPA on eleven metals and alloys at temperatures ranging from 150° F. to 250° F. have given rates of 0.45 to 11.3 mpy (see Table 2).

These results indicate that a nominal 1:1 blend made from 48% overtreated, filtered dihydrate SPA and 48% untreated, unfiltered hemihydrate SPA is easily made, has acceptable storage properties, and can be converted to high quality 10-34-0 fertilizer. For maximum efficiency, the blending should be done at the port utilizing static mixers and other suitable equipment. Solids in the blend can be uniformly distributed by use of distributor pipes ("diffusers") and pumps already installed.

EXAMPLE 6

In the following description "CFP" indicates a solid precipitant containing calcium and fluoride.

IV. SPA Made from 48% $P_2O_5$ Dihydrte Acid Which Was Overtreated With CFP and Filtered Prior to treatment with CFP, plant dihydrate acid had a nominal analysis as listed in FIG. 7 (IA)*. After treatment with CFP for four days at 140° F. and subsequent filtration through Kenite 5500 diatomaceous earth, the clear filter acid (IB) analyzed 51.87% $P_2O_5$, $R_{MgO}=0.135$, (FIG. 7). Concentration to 54% (IC) in a batch evaporator (186° F./26.7" Hg vacuum) was effected smoothly. The acid was then concentrated to SPA (ID) in a single tube forced circulation evaporator (STFCE) at 390° F./27.5" Hg vacuum.

*Actual analysis is on Table 5

Aging tests at 150° F. and 180° F. on this overtreated dihydrate SPA were started several weeks later. By that time, conversion had decreased to 26.7% and solids measured 0.11% by weight. Initial viscosity measured at 150° F. was less than 400 cp and below 500 cp after 140 days storage at 150° F. Dynamic corrosion tests at 250° F. gave mpy's of 2.1 for Hastelloy G, 1.8 for Hastelloy C-276, and 1.1 for Inconel 625. Corrosion values for the 54% acid at 180° F. ranged between 0.7 and 6.3 mpy for eleven stainless metals and alloys (Table 2).

The above tests show that overtreated, filtered dihydrate SPA offers neither difficulties to produce nor excessive corrosion problems at 250° F. After 334 hours at 400° F., dynamic corrosion tests on Hastelloys G and C-276 and Inconel 625 gave 3.2, 5.1 and 8.6 mpy respectively (Table 2). In aging tests, after 140 days conversion was nearly constant. Solids content was unchanged at 150° F.; while at 180° F., solids level was nearly constant. Conversion of this overtreated, filtered dihydrate SPA to 10-34-0 liquid fertilizer and subsequent storage testing was not undertaken.

EXAMPLE 7

V. SPA Made from 38% Hemihydrate Acid, Untreated, Unfiltered 37.6% $P_2O_5$ hemihydrate acid (FIG. 8, IIA) was successively batch evaporated to 48% $P_2O_5$ (IIB), to 54% (IIC), and finally concentrated to SPA (IID), see Table 6.

Aging studies at 150° F. and 180° F. on this SPA made from untreated, unfiltered acid were started after several weeks at which time conversion was 35%; and the solids level analyzed for 2.59%. After 119 days at 150° F. and 180° F., there was very little change in conversion (36%); but solids content increased at a rate of 0.7%/month, reaching a plateau of 5% after 69 days. Similar results were obtained at 180° F.

Settling tests on this hemihydrate SPA at 150° F. indicated that after twelve weeks, the upper layer, about 81% of the total volume, contained 0.53% of dimethyl formamide insoluble (DMFI) solids. In the lower layer (19% of the volume), the solids content had increased to 13.8% by weight. Initially, solids content was 2.59.

At the six week interval, the lower layer solids were 5.7, showing that solids settling more than doubled in six weeks. This suggests that it may not be advisable to store hemihydrate SPA's made from untreated, unfiltered feed acid* which have higher (than normal) solids content beyond six weeks unless continuous agitation is provided to suspend the solids. The viscosity, initially, measured at 150° F., was about 800 cps; but after 121 days storage at 180° F., measured 566 cp.

Corrosion tests at 150° F. on a series of metals with 48% $P_2O_5$ hemihydrate gave mpy values less than 11.3 (Table 2). At the 54% level at 180° F., mpy's were less than 2.4. At the SPA level and 250° F., corrosion values for Hastelloy G, Hastelloy C-276, and Inconel 625 were 2.4, 0.9, and 1.0 mpy respectively and between 1.7 and 4.0 mpy for nine other metals and alloys. At 400° F. after 334 hours, Hastelloy C-276 and Inconel 625 had values of 12.7 and 12.4 mpy respectively.

No difficulties were encountered during concentration to SPA; but the increasing solids content during storage might pose a problem during pumping.

EXAMPLE 8

VI. SPA Made From a Blend of One Part Dihydrate SPA, Overtreated and Filtered at the 48% $P_2O_5$ Level, and One Part 48% Untreated, Unfiltered Hemihydrate SPA Equal parts of 48% overtreated, filtered dihydrate SPA (ID) and 48% untreated, unfiltered hemihydrate SPA (IID), both at 140° F., were mixed by passage through a static mixer (FIG. 9). Uniformity of blend was monitored by conductivity. Because a difference in viscosities affected relative pumping rates, however, the initial blend was about 2:1 dihydrate/hemihydrate. After adjustment to 1:1, the final blend (FIG. 9, III), showed 28.9% conversion. A portion of this blend was then converted to 10-34-0 for storage tests. This fairly high conversion* liquid fertilizer had only 0.28 V% solids after 400 days storage.
*About 70%.

Aging characterization of this blend was discontinued after twenty weeks with a rate of solids formation of 0.36%/month. Solids content leveled at 3.0 to 3.5% after 88 days, and conversion was nearly constant at 31.5%. Initially, viscosity of the blend, measured at 150° F., was about 400 cp; and after 140 days at 180° F., viscosity was about 500 cp.

For comparison, several other nominal 1:1 blends were made with 48% overtreated, filtered dihydrate SPA and each of the partially purified hemihydrate SPA's shown below:

| Hemihydrate | Treatment |
|---|---|
| IIE | Settled at 40% $P_2O_5$ |
| IIF | Settled at 40% $P_2O_5$, filtered at 48% $P_2O_5$ |
| IIG | Filtered at 48% $P_2O_5$ |
| IIH | Settled at 48% $P_2O_5$ |

Storage characteristics of these four blends were studied. While solids were generally lower after 140 days at 150° F. and 180° F., compared to the untreated, unfiltered hemihydrate SPA blend, conversion decreased drastically from 35-30%, down to 19-13%. For the untreated, unfiltered hemihydrate blend, conversion increased to 31.5% and leveled out after 88 days.

Of the 10-34-0 liquid fertilizers using the blends made from the partially purified hemihydrate SPA's (IIE–IIH), only those made with IIG and IIH were still viable: 0.28 V% solids/272 days and 0.29 V% solids/280 days respectively. The fertilizers made from blends IIE and IIF failed, both having over 3 V% solids after 346 days and 321 days respectively.

These Examples show that it is feasible to mix SPA's made from 48% overtreated, filtered dihydrate and 48% untreated, unfiltered hemihydrate acids to produce an homogeneous SPA blend which can be successfully shipped by ocean vessel and, upon ammoniation, converted to a good liquid fertilizer.

Use of untreated, unfiltered hemihydrate SPA for blending is usually recommended since storage characteristics of the four blends made from partially purified hemihydrate SPA's were not sufficiently improved over the blend made with untreated, unfiltered hemihydrate SPA to usually warrant the increased costs for treatment.

Since aging characteristics of blends mixed at the SPA level and blends mixed at the 48% $P_2O_5$ level are both acceptable, the final selection on choice of methods will usually rest on economic evaluation of a given product.

A static mixer is preferred for blending because of lower equipment costs and improved blend homogeneity. For storage, each two million gallon tank should be fitted with diffusers and pumps to ensure good mixing and uniform distribution of solids. Differences in component viscosities are not expected to cause blending problems.

One Process for producing low R-value phosphoric acid, for use as a blending components in the present invention involves maintaining superphosphoric acid at a temperature above about 400° F. for up to about four days and then filtering the hot, aged acid through diatomaceous earth on a rotary drum filter (or through stainless steel mesh) to separate a black magnesium-containing precipitate from the liquid acid. Surprisingly, the filter rates on a $P_2O_5$ basis are as good or better than for filtration of 54% or lower grade acid. It has also been discovered that much of the magnesium is in the form of magnesium acid pyro-phosphate and that this material can be put directly into triple phosphate fertilizer because it is low in silica.

Also surprising is that the losses across the filter are less than with the lower concentration acids filtered at lower temperatures.

Also less corrosion has been observed, as of stainless steel, probably because of the low fluoride content of the hot super acid.

Compared to prior plant processes, this process should be less expensive in investment because it can use the usual rotary drum filters and the usual tankage found in wet process phosphoric acid plants but no coolers are required. The only additional plant investment required is to insulate the tankage to permit maintaining the temperature above about 400° F. The acid out of an SPA evaporator is typically in the range of 450° F.

This process is especially useful for magnesium impurity removal from South African acid containing about 2.5% MgO.

Iron containing additives such as the slag from an elemental phosphorus furnace can be added to the hot SPA before completion of the aging to improve the rate and degree of removal.

This process is the invention of Samuel F. Sweat, William S. Newsom, Jr., and Francis M. Sale will be claimed in a later filed application.

TABLE 1

SUPERPHOSPHORIC ACID ANALYSIS*

| TANK CAR | | $P_2O_5$ | ORTHO | CONV | $SO_4$ | $Fe_2O_3$ | $Al_2O_3$ | MgO | Susp. Solids | F | Sp. Gr.* 65° C. | Visc. 65° C. |
|---|---|---|---|---|---|---|---|---|---|---|---|---|
| A. | Gypsum SPA | 68.58 | 47.13 | 31.28 | 3.68 | 1.15 | 1.18 | 0.22 | 0.39 | 0.31 | | 365 |
| B. | " | 69.18 | 46.83 | 32.23 | 4.66 | 1.12 | 1.12 | 0.23 | 0.28 | 0.31 | | 381 |
| C. | " | 68.00 | 47.70 | 29.85 | 5.29 | 1.13 | 1.30 | 0.27 | 0.07 | 0.34 | | 377 |
| D. | " | 68.47 | 47.98 | 29.93 | 5.08 | 1.14 | 1.24 | 0.26 | 0.05 | 0.32 | | 373 |
| E. | Hemi SPA | 69.01 | 47.85 | 30.66 | 3.13 | 2.26 | 1.15 | 0.80 | 0.31 | 0.08 | | 628 |
| F. | " | 69.10 | 47.54 | 31.20 | 3.21 | 2.26 | 1.29 | 0.81 | 0.15 | 0.09 | | 777 |
| G. | " | 70.03 | 47.73 | 31.84 | 3.02 | 2.23 | 1.27 | 0.78 | 0.15 | 0.10 | | 833 |
| Ship Blend | | 69.17 | 48.51 | 29.87 | — | 1.45 | 1.73 | 0.35 | — | — | 2.003 | 447 |

*Weight percent, except for Specific Gravity (Sp. Gr.) and Viscosity (Visc.). ORTHO is weight percent orthophosphoric acid and CONV is the weight % of "Non-Ortho-" or "Polyphosphate", compared to the total phosphate in the acid

TABLE 2

CORROSION RATES IN MILS PER YEAR*
Acid and Temperature (°F.)

| Metal | A 150° | B 150° | C 150° | D 180° | E 180° | G 250° | F 250° | F 400° | H 400° | G 400° | H 175° |
|---|---|---|---|---|---|---|---|---|---|---|---|
| SS 316 | 1.3 | 0.9 | | | 3.8 | 4.1 | | | | | |
| SS 317 | 0.6 | 0.8 | | | 2.3 | 3.4 | | | | | |
| SS 316 L | | | 11.3 | 6.3 | | | | | | | |
| SS 316 L | | | | 2.0 | 3.0 | | | | | | |
| Jessop 700 | 2.4 | 0.6 | 2.6 | 2.4 | 2.0 | 3.7 | | | | | |
| Carp. 20 Cb-3 | 1.1 | 1.5 | 2.1 | 2.2 | 2.1 | 3.3 | | | | | |
| Illium P | | | | 0.6 | 1.0 | 2.3 | | | | | |
| Illium G | | | | 2.3 | | 2.6 | | | | | |
| Illium 98 | | | | 3.3 | 0.5 | 1.7 | | | | | |
| CD4MCu | | | | 0.7 | 0.7 | 4.0 | | | | | |
| Inconel 625 | | | | 2.1 | 1.4 | 1.5 | 1.1 | 7.6 | | 15.0 | |
| Hastelloy G | | | | 4.0 | 2.4 | 3.1 | 2.1 | 5.3 | 5.1 | | |
| Hastelloy C-276 | | | | | | 0.9 | 1.8 | 5.1 | | 16.1 | |
| Alloy 20 | | | | 2.4 | 2.1 | 3.1 | | | | | |
| Sandvik 28 | | | | | | | | 14.5 | | 76.4 | |
| Butylrubber coated mild steel | | | | | | | | | | | 1.5 |
| Vinylester coated mild steel | | | | | | | | | | | 2.6 |

A - Untreated, unfiltered 48% DH
B - Overtreated, filtered 48% DH
C - Untreated, unfiltered 48% Hemi
D - Overtreated, filtered 48% Evaporated to 54% DH
E - Untreated, unfiltered 54% Hemi
F - DH SPA (48% Overtreated, filtered)
G - Hemi SPA (Untreated, unfiltered)
H - Treated DH SPA
*Run in the a Dynamic Corrosion Tester which moved totally immersed samples vertically with a sinusoidal oscillation of 2¼ inches amplitude and a frequency of about 0.5 cycles per second.

TABLE 3

| | $P_2O_5$ | $R^*_{MgO}$ | $R^*_{Al_2O_3}$ | $R^*_{Fe_2O_3}$ | $SO_4$ | Solids | Conv. | |
|---|---|---|---|---|---|---|---|---|
| | 47.5 | 0.44 | 2.13 | 2.27 | 1.39 | 0.09 | — | IB |
| Total | 48.2 | 1.54 | 3.78 | 2.84 | 4.40 | 2.62 | — | IA |
| Soluble | 48.3 | 0.91 | 2.91 | 2.63 | 3.93 | — | — | |
| Total | 46.4 | 0.71 | 2.59 | 2.41 | 2.14 | 0.69 | — | IC |
| Soluble | 46.9 | 0.53 | 2.28 | 2.31 | 2.01 | — | — | |
| Total | 53.3 | 0.71 | 2.59 | 2.34 | 2.46 | 0.50 | — | ID |
| Soluble | 53.8 | 0.63 | 2.47 | 2.36 | 2.30 | — | — | |
| | 68.1 | 0.69 | 2.82 | 2.57 | 2.58 | 0.41 | 19.3 | IE |

*R = 100 × % Metal Oxide/% $P_2O_5$

TABLE 4

| | $P_2O_5$ | $R^*_{MgO}$ | $R^*_{Al_2O_3}$ | $R^*_{Fe_2O_3}$ | $SO_4$ | Solids | Conv. | |
|---|---|---|---|---|---|---|---|---|
| Total | 40.8 | 1.30 | 2.79 | 2.89 | 2.82 | 0.26 | — | IIA |
| Soluble | 40.9 | 1.32 | 2.89 | 2.89 | 2.49 | — | — | |
| Total | 50.2 | 1.36 | 2.81 | 1.91 | 3.79 | 2.84 | — | IIB |
| Soluble | 51.1 | 1.29 | 2.62 | 1.78 | 2.51 | — | — | |
| | 47.5 | 0.44 | 2.13 | 2.27 | 1.39 | 0.09 | — | IB |
| Total | 48.2 | 0.62 | 2.18 | 2.39 | 1.84 | 1.02 | — | IIC |
| Soluble | 48.4 | 0.60 | 2.13 | 2.23 | 1.49 | — | — | |
| Total | 51.7 | 0.66 | 2.19 | 2.51 | 1.59 | 0.23 | — | IID |
| Soluble | 53.0 | 0.64 | 2.13 | 2.46 | 1.51 | — | — | |
| | 71.3 | 0.70 | 2.38 | 2.19 | 1.80 | 0.97 | 33.2 | IIE |

TABLE 5

| | $P_2O_5$ | $R^*_{MgO}$ | $R^*_{Al_2O_3}$ | $R^*_{Fe_2O_3}$ | $SO_4$ | Solids | Conv. | |
|---|---|---|---|---|---|---|---|---|
| Total | 48.20 | 1.535 | 3.78 | 2.84 | 4.40 | 2.62 | — | IA |
| Soluble | 48.33 | 0.91 | 2.92 | 2.63 | 3.93 | — | — | |
| | 51.87 | 0.135 | 1.99 | 2.61 | 1.14 | 0.05 | — | IB |
| | 55.9 | 0.14 | 1.93 | 2.70 | 1.37 | 0.13 | — | IC |
| | 70.9 | 0.17 | 2.02 | 2.50 | 1.56 | 0.14 | 30.1 | ID |

*R = 100 × % Metal Oxide/% $P_2O_5$

TABLE 6

| $P_2O_5$ | $R^*_{MgO}$ | $R^*_{Al_2O_3}$ | $R^*_{Fe_2O_3}$ | $SO_4$ | Solids | Conv. | |
|---|---|---|---|---|---|---|---|
| 37.6 | 1.41 | 2.98 | 2.74 | 3.16 | 2.23 | — | IIA |
| 48.9 | 1.29 | 2.74 | 2.58 | 4.12 | 2.88 | — | IIB |
| 53.6 | 1.36 | 2.69 | 2.52 | 2.56 | 0.14 | — | IIC |
| 69.4 | 1.25 | 2.74 | 2.67 | 3.86 | 4.11 | 37.3 | IID |

*R = 100 × % Metal Oxide/% $P_2O_5$

TABLE 7

| $P_2O_5$ | $R^*_{MgO}$ | $R^*_{Al_2O_3}$ | $R^*_{Fe_2O_3}$ | $SO_4$ | Solids | Conv. | |
|---|---|---|---|---|---|---|---|
| 69.4 | 1.25 | 2.74 | 2.67 | 3.86 | 4.11 | 37.3 | IID |
| 70.9 | 9.17 | 2.02 | 2.50 | 1.56 | 0.14 | 30.1 | ID |
| 69.8 | 0.76 | 2.39 | 2.61 | 2.03 | 1.88 | 28.9 | III |

*R = 100 × % Metal Oxide/% $P_2O_5$

What is claimed:

1. Process for producing a blended phosphoric acid having an R-value no greater than about 0.86, where the R-value is one hundred times the ratio of the MgO analysis by weight divided by the $P_2O_5$ analysis by weight of said acid, said process comprising blending a sufficient amount of at least one purified dihydrate process phosphoric acid having an R-value less than 0.86 with at least one phosphoric acid produced by a hemihydrate process and having an R-value greater than 0.86, to produce a blended phosphoric acid having an R-value no greater than about 0.86; wherein said purified phosphoric acid is purified by aging a dihydrate process phosphoric acid for sufficient time to allow at least some magnesium-containing solids to precipitate from said acid and separating at least some of said precipitated magnesium containing solids from said phosphoric acid by filtration to produce said purified dihydrate process phosphoric acid having an R-value less than 0.86.

2. The process of claim 1 wherein each of said phosphoric acids which are blended is a superphosphoric acid analyzing in the range of about 68 to about 72 weight percent $P_2O_5$.

3. The process of claim 1 wherein at least one said purified dihydrate process phosphoric acid has an R-value less than about 0.6.

4. The process of claim 3 wherein prior to completion of said aging a precipitant comprising calcium and fluoride is added to said phosphoric acid produced by the dihydrate process.

5. The process of claim 3 wherein at least one said dihydrate process phosphoric acid having an R-value less than 0.86 is blended with at least one phosphoric acid produced by a hemihydrate process and the resulting blend is concentrated by evaporation to produce a phosphoric acid of higher $P_2O_5$ analysis than in said resulting blend.

6. The process of claim 5 wherein said evaporated resulting blend is a superphosphoric acid having a $P_2O_5$ analysis in the range of about 68 to about 72 weight percent and an R-value less than about 0.86.

7. The process of claim 1 wherein at least one said phosphoric acid produced by a dihydrate process, is concentrated by evaporation prior to said blending.

8. The process of claim 7 wherein after said concentration said phosphoric acid, produced by a dihydrate process, analyzes in the range of about 42 to about 58 weight percent $P_2O_5$.

9. The process of claim 8 wherein said purified dihydrate process phosphoric acid has an R-value no greater than about 0.6.

10. The process of claim 1 wherein said blended phosphoric acid analyzes in the range of about 42–58 weight % $P_2O_5$ and said blended phosphoric acid is concentrated by evaporation to produce a superphosphoric acid analyzing in the range of about 68–72 weight % $P_2O_5$.

11. Process for producing a blended phosphoric acid having an R-value no greater than about 0.86, where the R-value is one hundred times the ratio of the MgO analysis by weight divided by the $P_2O_5$ analysis by weight of said acid, said process comprising blending a sufficient amount of at least one purified dihydrate process phosphoric acid having an R-value less than 0.86 with at least one phosphoric acid produced by a hemihydrate process and having an R-value greater than 0.86, to produce a blended phosphoric acid having an R-value no greater than about 0.86; wherein said purified phosphoric acid is purified by aging a dihydrate process phosphoric acid for sufficient time to allow at least some magnesium-containing solids to precipitate from said acid to produce a purified dihydrate process phosphoric acid having an R-value less than 0.86.

12. The process of claim 11 wherein the blended phosphoric acid having an R-value no greater than about 0.86 is filtered after the blending step to produce a filtered phosphoric acid.

13. The process of claim 12 wherein the filtered phosphoric acid is concentrated by evaporation to produce a phosphoric acid of higher P$_2$O$_5$ analysis than the P$_2$O$_5$ analysis of the filtered phosphoric acid.

14. The process of claim 1 wherein the weight ratio of said purified dihydrate process phosphoric acid to said phosphoric acid produced by the hemihydrate process, in said blend, is in the range of about 10:1 to about 1:4.

15. The process of claim 14 wherein said ratio is in the range of about 4:1 to about 1:3.

16. The process of claim 15 wherein said ratio is in the range of about 3:1 to about 7:3.

17. The process of claim 1 wherein said filtration is through a filter aid.

18. The process of claim 1 wherein after said dihydrate process phosphoric acid is first aged in a settling tank for sufficient time to allow some magnesium-containing solids to form and to settle:
   (i) the aged phosphoric acid is separated from the settled solids by decantation, to form a clarified dihydrate process phosphoric acid;
   (ii) said clarified dihydrate process phosphoric acid is further aged for sufficient time to allow additional magnesium-containing solids to precipitate from said clarified dihydrate process phosphoric acid to produce a dihydrate process phosphoric acid containing magnesium-containing solids;
   (iii) at least some of the precipitated magnesium-containing solids are separated by filtration from the dihydrate process phosphoric acid containing magnesium-containing solids to produce said purified dihydrate process phosphoric acid having an R-value less than 0.86.

19. The process of claim 18 wherein said filtration is through a filter aid.

20. The process of claim 1 wherein the phosphoric acids are concentrated to at least about 44% P$_2$O$_5$ prior to said blending.

21. The process for producing a superphosphoric acid having a P$_2$O$_5$ analysis of about 70% and an R-value no greater than about 0.86, where the R-value is one hundred times the ratio of the MgO analysis by weight divided by the P$_2$O$_5$ analysis by weight of said acid, said process comprising:
   (a) blending a sufficient amount of at least one purified dihydrate process phosphoric acid containing about 48% P$_2$O$_5$ and having an R-value less than about 0.6 with at least one phosphoric acid produced by a hemihydrate process which contains about 48% P$_2$O$_5$ and has an R-value greater than 0.86, to produce a phosphoric acid blend having an R-value no greater than about 0.86; wherein said purified dihydrate process phosphoric acid is purified by treatment with a precipitant comprising calcium and fluoride followed by aging the purified dihydrate process phosphoric acid for sufficient time to allow at least some magnesium-containing solids to precipitate from said acid and separating at least some of said precipitated magnesium-containing solids from said phosphoric acid by filtration through a filter aid to produce said purified dihydrate process phosphoric acid having an R-value less than about 0.6;
   (b) concentrating said phosphoric acid blend in a first evaporation step to produce a phosphoric acid having a P$_2$O$_5$ analysis of about 54% P$_2$O$_5$; and
   (c) concentrating said phosphoric acid produced in step b in a second evaporation step to produce a superphosphoric acid having a P$_2$O$_5$ analysis of about 70% P$_2$O$_5$.

* * * * *